United States Patent
Toya et al.

(10) Patent No.: US 7,676,898 B2
(45) Date of Patent: Mar. 16, 2010

(54) METHOD AND APPARATUS FOR MANUFACTURING

(75) Inventors: Kiyoto Toya, Nagano (JP); Masami Tagawa, Nagano (JP); Akira Ohira, Myoko (JP); Shinya Matsuzawa, Nagano (JP); Youichi Komamura, Tendo (JP); Kenji Fukase, Higashine (JP)

(73) Assignee: Fujitsu Limited, Kawasaki (JP)

( * ) Notice: Subject to any disclaimer, the term of this patent is extended or adjusted under 35 U.S.C. 154(b) by 1103 days.

(21) Appl. No.: 11/327,496

(22) Filed: Jan. 9, 2006

(65) Prior Publication Data

US 2007/0062827 A1 Mar. 22, 2007

(30) Foreign Application Priority Data

Sep. 20, 2005 (JP) .............................. 2005-272255

(51) Int. Cl.
*B23P 17/00* (2006.01)
*B23P 19/00* (2006.01)

(52) U.S. Cl. ................... 29/407.01; 29/603.01; 29/700; 29/806

(58) Field of Classification Search ............. 29/603.01, 29/603.08, 737, DIG. 95, 806, 407.01, 407.09, 29/407.1, 700
See application file for complete search history.

(56) References Cited

U.S. PATENT DOCUMENTS 5,979,034 A * 11/1999 Higuchi et al. ........... 29/407.01

FOREIGN PATENT DOCUMENTS

JP 56-90428 7/1981

* cited by examiner

*Primary Examiner*—Jermie E Cozart
(74) *Attorney, Agent, or Firm*—Kratz, Quintos & Hanson, LLP (57) ABSTRACT

Magnetic recording media are smoothed with a tape. Each magnetic recording medium has a magnetic film and a lubricant film thereon. Next, the smoothed magnetic recording media are taken out from a process case and put in a shipping case. The magnetic recording media are then taken out from the shipping case and tested. Non-defective ones of the magnetic recording media are put in the shipping case.

4 Claims, 5 Drawing Sheets

METHOD AND APPARATUS FOR MANUFACTURING

BACKGROUND OF THE INVENTION

1. Field of the Invention

The present invention relates to a method and apparatus for manufacturing magnetic recording media, and more specifically, it relates to removal of dust from magnetic recording media.

2. Description of the Related Art

In conventional processes for manufacturing magnetic disk media, a magnetic film is formed on a magnetic disk medium, and then lubricant is applied to the magnetic disk medium. The magnetic disk medium coated with lubricant is then smoothed with a tape. The smoothed magnetic disk medium is then tested. After the testing is completed, non-defective ones of the media are transferred from a case for testing to a shipping case. Some of the media are checked for surface defects, and lots meeting the acceptability criterion are shipped. In this checking, the media are checked for dust contamination caused by handling when the media are transferred to the shipping case. In order to minimize the dust contamination of the media, it is ideal to pack the media in a clean shipping case just after the testing. However, in order to realize this, it is necessary to supply a case for testing and a shipping case at the same time and to incorporate equipment for it into the line. This is difficult because the cost of equipment and the space occupied by equipment increase. Japanese Unexamined Patent Application Publication No. 56-090428 proposes to perform the tape burnishing again when magnetic disk media are attached to magnetic disk devices. However, dust contamination when magnetic disk media are put in a shipping case is not taken into consideration.

SUMMARY OF THE INVENTION

It is an object of the present invention to transfer magnetic disk media to a shipping case as near to the testing step as possible during the process for manufacturing magnetic disk media, to thereby reduce the number of handling and the time of exposure to the environment, to thereby prevent dust contamination and damage, and to thereby improve the quality.

In the method for manufacturing magnetic recording media of the present invention, first, magnetic recording media are smoothed with a tape. Each magnetic recording medium has a magnetic film and a lubricant film thereon. Next, the smoothed magnetic recording media are taken out from a process case and put in a shipping case. The magnetic recording media are then taken out from the shipping case and tested. Non-defective ones of the magnetic recording media are put in the shipping case.

As a result, the risk of dust contamination can be reduced, and therefore the quality of magnetic disk media can be improved. These and other objects, features and advantages of the present invention will become more apparent upon reading of the following detailed description along with the accompanied drawings.

DESCRIPTION OF THE PREFERRED EMBODIMENTS

Figure 1:
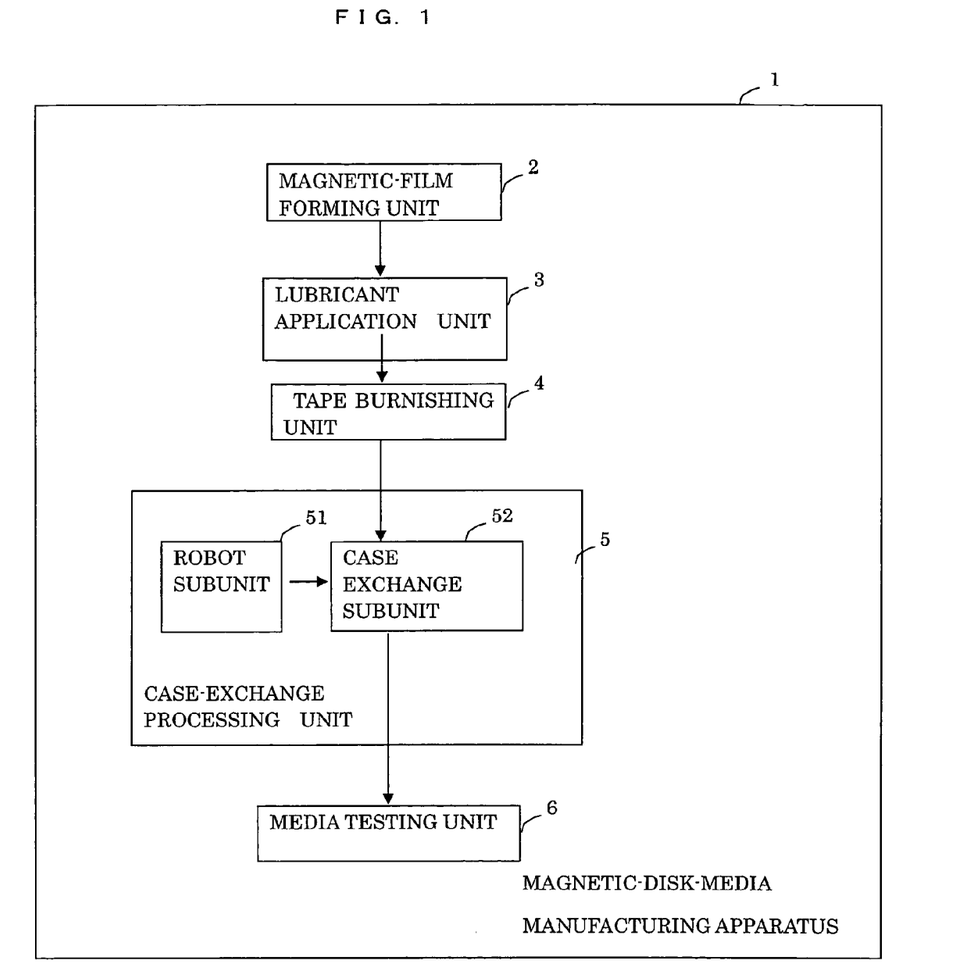
FIG. 1 is a block diagram of a magnetic-disk-media manufacturing apparatus of an embodiment.

FIG. 1 shows a block diagram of a magnetic-disk-media manufacturing apparatus.

The magnetic-disk-media manufacturing apparatus 1 includes a magnetic-film forming unit 2, a lubricant application unit 3, a tape burnishing unit 4, a case-exchange processing unit 5, and a media testing unit 6.

Figure 2A:
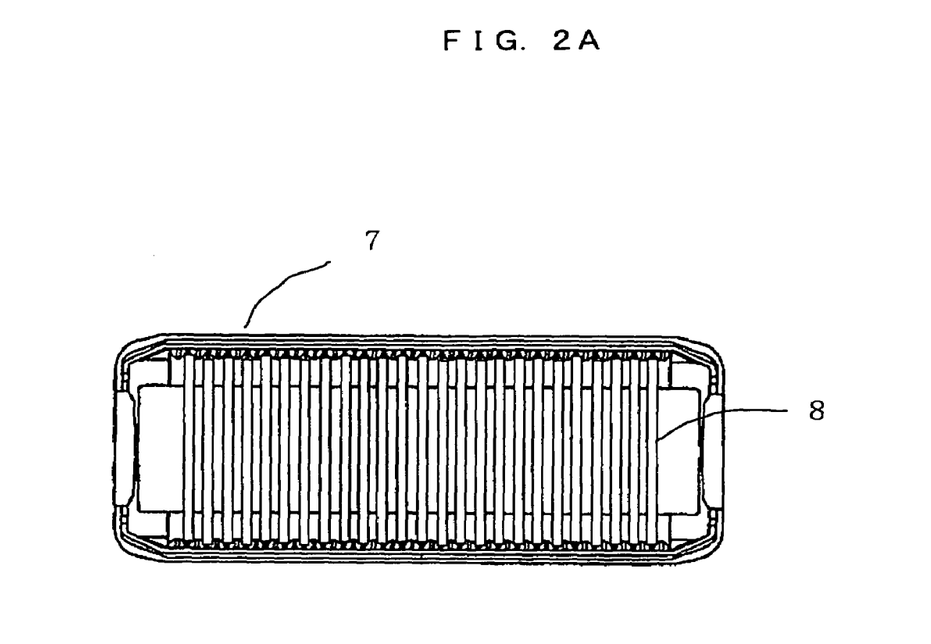
FIGS. 2A and 2B are explanatory views of a process case of the embodiment.
Figure 2B:
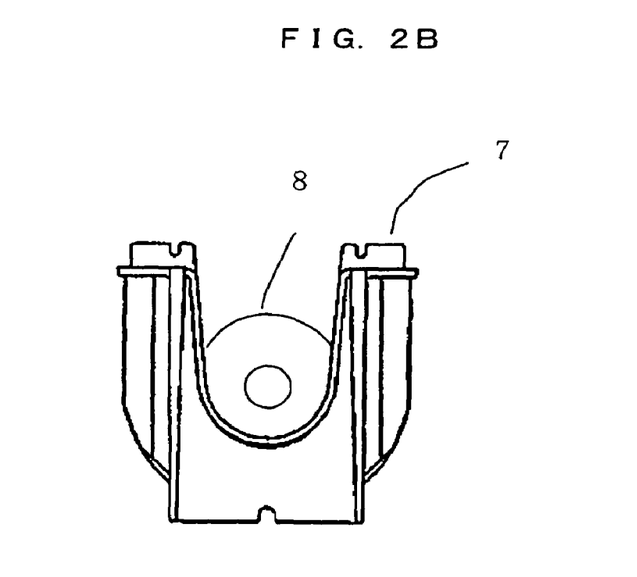

FIGS. 2A and 2B show explanatory views of a process case of the embodiment.

FIG. 2A is a plain view of the process case 7. As shown in FIG. 2A, the process case 7 contains 25 magnetic disk media 8.

FIG. 2B is a side view of the process case 7.

Each unit of the magnetic-disk-medium manufacturing apparatus 1 is explained by using FIG. 1 and FIG. 2.

The case-exchange processing unit 5 includes a robot subunit 51 and a case exchange subunit 52.

In the magnetic-film forming unit 2, substrates of magnetic disk media 8 are taken out from a process case 7, a magnetic film is formed on each magnetic disk medium 8, and the magnetic disk media 8 are then returned to the process case 7. The process case 7 is a case for containing magnetic disk media 8. The process case 7 is conveyed with conveyers from one step to another step.

In the lubricant application unit 3, the magnetic disk media 8 are taken out from the process case 7 all at the same time and soaked in a lubricant bath. After a certain period of time, the magnetic disk media 8 are returned to the process case 7.

In the tape burnishing unit 4, the magnetic disk media 8 are taken out from the process case 7 one at a time. The roughness and dust on the surface of each magnetic disk medium 8 are removed with a burnishing tape. The magnetic disk media 8 are then returned to the process case 7.

In the case-exchange processing unit 5, the magnetic disk media 8 are transferred from the process case 7 to a shipping case.

The process case 7 is a case for containing magnetic disk media 8 and is cleaned before being used in the process. However, the process case 7 can be contaminated with dust during the process because taking out and putting in of the magnetic disk media 8 are performed several times. Therefore, a new cleaned case for shipping is used.

The case exchange subunit 52 puts a shipping case on the conveyer and conveys the shipping case to a hanger 11 in order to exchange the shipping case for the process case 7.

The robot subunit 51 separates the tape-burnished magnetic disk media 8 from the process case 7 using the hanger 11. The separated magnetic disk media 8 are then put in the shipping case. The shipping case is put on a conveyer to the media testing unit 6.

The empty process case 7 is removed by the case exchange subunit 52.

The media testing unit 6 takes out the magnetic disk media 8 from the shipping case one at a time and performs a read/write test.

Figure 3:
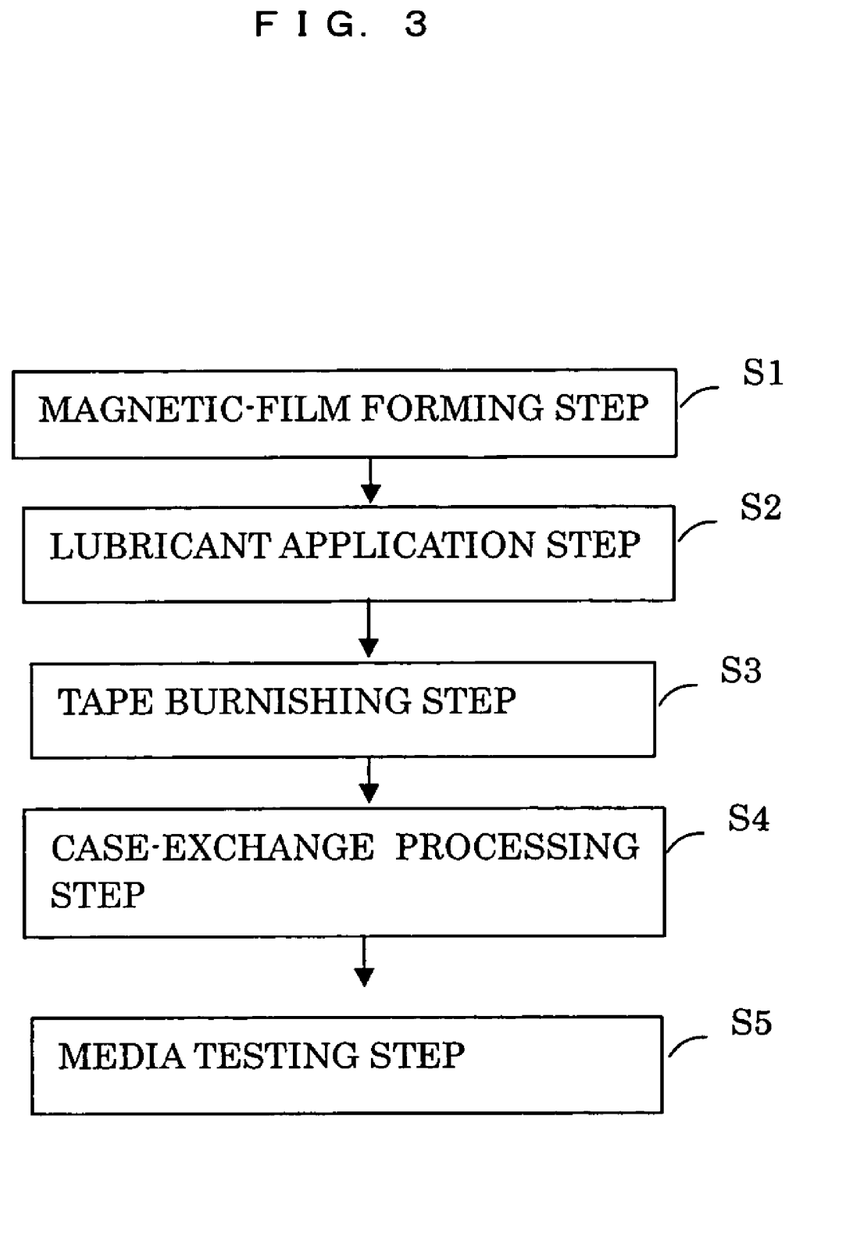
FIG. 3 is a flow chart showing a process of manufacturing magnetic disk media of the embodiment.

FIG. 3 is a flow chart showing a process of manufacturing magnetic disk media of the embodiment.

The process of manufacturing magnetic disk media 8 includes a magnetic-film forming step (S1), a lubricant application step (S2), a tape burnishing step (S3), a case-exchange processing step (S4), and a media testing step (S5).

First, the magnetic-film forming unit 2 performs the magnetic-film forming step (S1). Substrates of magnetic disk media 8 are taken out from a process case 7. A base film, magnetic film, and protective film are formed on each magnetic disk medium 8. The magnetic disk media 8 are returned to the process case 7. The process case 7 is conveyed to the next step with a conveyer.

Next, the lubricant application unit 3 performs the lubricant application step (S2). The magnetic disk media 8 are taken out from the process case 7 all at the same time and soaked in a lubricant bath. After a certain period of time, the magnetic disk media 8 are returned to the process case 7. The process case 7 is conveyed to the next step with a conveyer.

Next, the tape burnishing unit 4 performs the tape burnishing step (S3). The magnetic disk media 8 are taken out from the process case 7 one at a time. The roughness and dust on the surface of each magnetic disk medium 8 are removed with a burnishing tape. The magnetic disk media 8 are then returned to the process case 7. The process case 7 is conveyed to the next step with a conveyer.

Next, the case-exchange processing step (S4) is performed. The magnetic disk media 8 are taken out from the process case 7 all at the same time and transferred to a shipping case all at the same time. The shipping case 7 is conveyed to the next step with a conveyer.

The media testing unit 5 performs the media testing step (S5). The magnetic disk media 8 are taken out from the shipping case one at a time. A read/write test is performed. On the basis of the test result, non-defective ones of the magnetic disk media 8 are returned to the shipping case.

Figure 4:
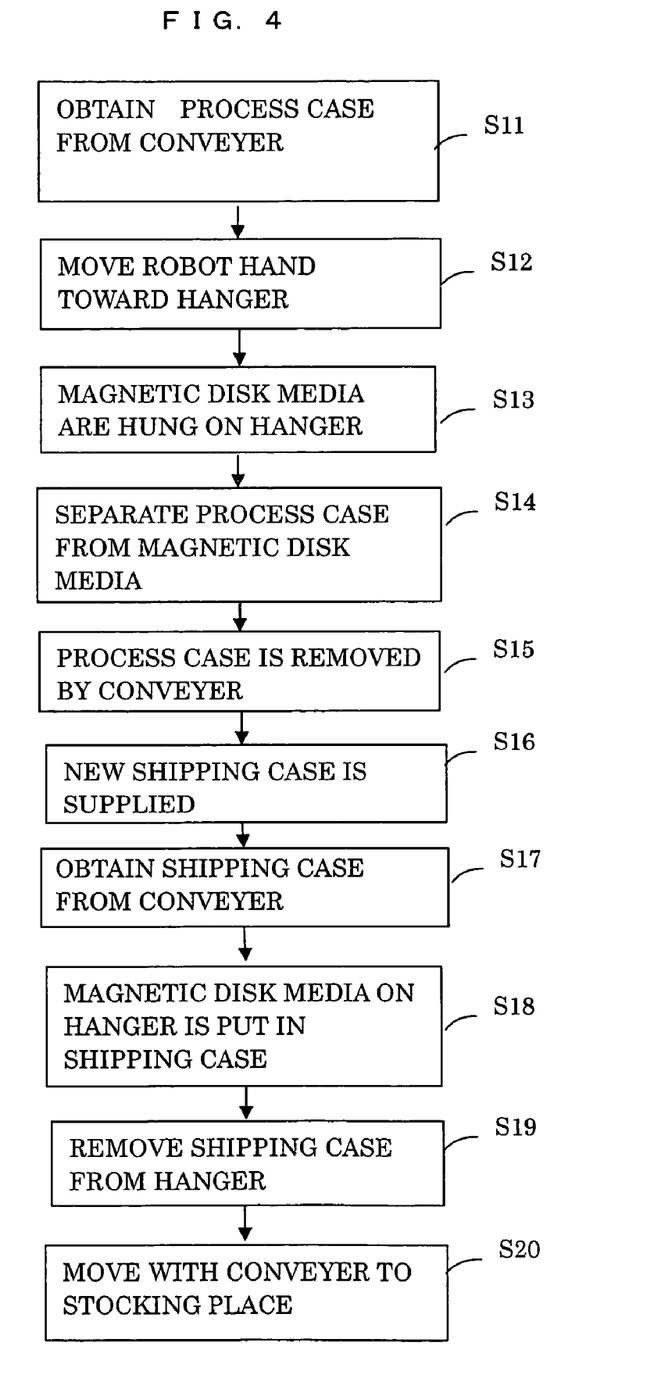
FIG. 4 is a flow chart showing a case-exchange processing step.
Figure 5A:
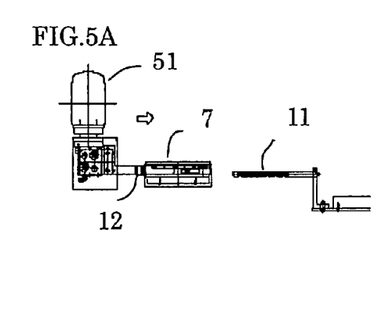
FIGS. 5A to 5H are explanatory views of the case-exchange processing step.
Figure 5B:
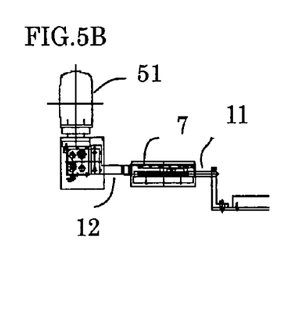
Figure 5C:
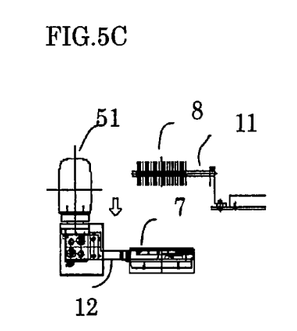
Figure 5D:
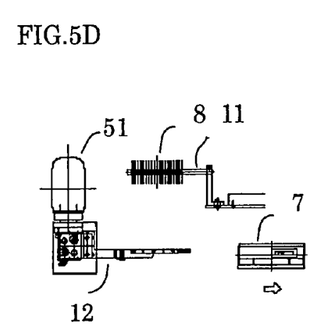
Figure 5E:
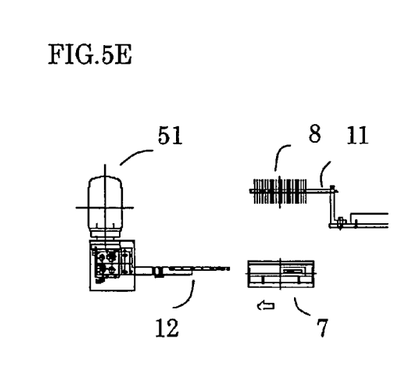
Figure 5F:
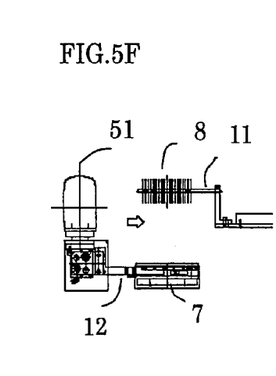
Figure 5G:
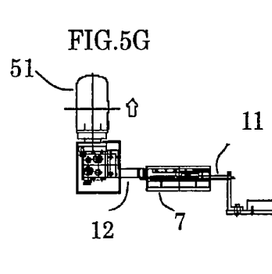
Figure 5H:
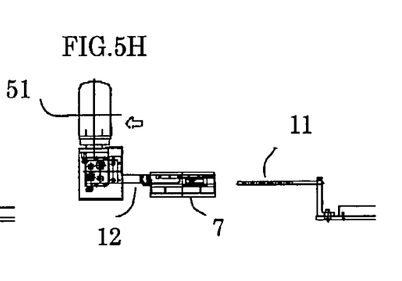

FIG. 4 is a flow chart showing the case-exchange processing step (S4).

FIGS. 5A to 5H are explanatory views of the case-exchange processing step (S4).

How the case-exchange processing step (S4) is performed will be described in detail.

The magnetic disk media 8 in the process case 7 are supplied from the tape burnishing step (S3) with a conveyer.

The robot subunit 51 for case exchange obtains the process case 7 from the conveyer (sub-step S11). See FIG. 5A.

The robot subunit 51 moves the robot hand 12 toward the hanger 11 provided in the case exchange subunit 52 (sub-step S12). See FIG. 5A.

The magnetic disk media 8 in the process case 7 are hung on the hanger 11 all at the same time (sub-step S13). See FIG. 5B.

The robot hand 12 moves downward so as to separate the process case 7 from the magnetic disk media 8 (sub-step S14). See FIG. 5C.

The process case 7 is removed by the conveyer of the case exchange subunit 52 (sub-step S15). See FIG. 5D.

A new shipping case is supplied from the conveyer of the case exchange subunit 52 (sub-step S16). See FIG. 5E.

The robot subunit 51 obtains the shipping case supplied from the conveyer of the case exchange subunit 52 (sub-step S17). See FIG. 5F.

The robot hand 12 moves upward, and the magnetic disk media 8 on the hanger 11 are put in the shipping case all at the same time (sub-step S18). See FIG. 5G.

The robot hand 12 moves backward, and the shipping case containing the magnetic disk media 8 is removed from the hanger 11 (sub-step S19). See FIG. 5H.

The robot hand 12 turns and puts the shipping case on the conveyer. The shipping case is moved with the conveyer to a stocking place for supplying to the magnetic disk media test (sub-step S20).

As a result, the present invention can reduce the risk of dust contamination. Therefore, the quality of magnetic disk media 8 can be improved. In addition, the present invention can eliminate the need for the surface-defect checking step, which has been provided between testing and shipping.

If a media transferring function is added to the tape burnishing unit, a new case can be supplied to the testing step with the current tape time maintained. Since a substantial change need not be made in the line, this method is less expensive.

This application is based on Japanese Patent Application serial no.2005-272255 filed in Japan Patent Office on 09/20/05, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A method for manufacturing magnetic recording media, wherein at the start of each step the magnetic recording media are taken out from a process case, and at the end of each step the magnetic recording media are returned to the process case and moved to the next step, the method comprising the steps of:
    (a) smoothing the magnetic recording media with a tape, each magnetic recording medium having a magnetic film and a lubricant film thereon;
    (b) taking out the smoothed magnetic recording media from the process case and putting the magnetic recording media in a shipping case; and
    (c) taking out the magnetic recording media from the shipping case, testing the magnetic recording media, and putting non-defective ones of the magnetic recording media in the shipping case.

2. The method according to claim 1, wherein said step (b) comprises the sub-steps of:
    (b-1) obtaining the process case containing the magnetic recording media;
    (b-2) hanging the magnetic recording media in the obtained process case onto a hanger all at the same time;
    (b-3) separating and removing the process case from the magnetic recording media hung on the hanger;
    (b-4) obtaining a shipping case;
    (b-5) putting the magnetic recording media hung on the hanger into the obtained shipping case all at the same time;
    (b-6) removing the shipping case containing the magnetic recording media from the hanger; and
    (b-7) supplying the removed shipping case to said step (c).

3. An apparatus for manufacturing magnetic recording media, wherein at the start of each step the magnetic recording media are taken out from a process case, and at the end of each step the magnetic recording media are returned to the process case and moved to the next step, the apparatus comprising:
    (a) means for smoothing the magnetic recording media with a tape, each magnetic recording medium having a magnetic film and a lubricant film thereon;

(b) means for taking out the smoothed magnetic recording media from the process case and putting the magnetic recording media in a shipping case; and (c) means for taking out the magnetic recording media from the shipping case, testing the magnetic recording media, and putting non-defective ones of the magnetic recording media in the shipping case.

4. The apparatus according to claim 3, wherein said means (b) comprises:

(b-1) sub-means for obtaining the process case containing the magnetic recording media;

(b-2) sub-means for hanging the magnetic recording media in the obtained process case onto a hanger all at the same time;

(b-3) sub-means for separating and removing the process case from the magnetic recording media hung on the hanger;

(b-4) sub-means for obtaining a shipping case;

(b-5) sub-means for putting the magnetic recording media hung on the hanger into the obtained shipping case all at the same time;

(b-6) sub-means for removing the shipping case containing the magnetic recording media from the hanger; and (b-7) sub-means for supplying the removed shipping case to said means (c).

* * * * *

UNITED STATES PATENT AND TRADEMARK OFFICE
CERTIFICATE OF CORRECTION

| | |
|---|---|
| PATENT NO. | : 7,676,898 B2 |
| APPLICATION NO. | : 11/327496 |
| DATED | : March 16, 2010 |
| INVENTOR(S) | : Kiyoto Toya et al. |

It is certified that error appears in the above-identified patent and that said Letters Patent is hereby corrected as shown below:

On the Title Page:

Item "(54)" the title should read as: --METHOD AND APPARATUS FOR MANUFACTURING MAGNETIC RECORDING MEDIA--

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,676,898 B2 |
| APPLICATION NO. | : 11/327496 |
| DATED | : March 16, 2010 |
| INVENTOR(S) | : Kiyoto Toya et al. |

It is certified that error appears in the above-identified patent and that said Letters Patent is hereby corrected as shown below:

On the Title Page, Item (54) and at Column 1, lines 1 and 2,

The title should read as: --METHOD AND APPARATUS FOR MANUFACTURING MAGNETIC RECORDING MEDIA--

This certificate supersedes the Certificate of Correction issued May 4, 2010.

Signed and Sealed this

First Day of June, 2010

David J. Kappos
*Director of the United States Patent and Trademark Office*